(12) United States Patent
Paradis et al.

(10) Patent No.: US 6,389,407 B1
(45) Date of Patent: May 14, 2002

(54) METHOD FOR DOCUMENTING ENGINEERING RULES

(75) Inventors: Michael J. Paradis, Lebanon, OH (US); Michael E. Graham, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/457,651

(22) Filed: Dec. 9, 1999

Related U.S. Application Data

(60) Provisional application No. 60/153,577, filed on Sep. 13, 1999.

(51) Int. Cl.7 .............................................. G06F 17/00
(52) U.S. Cl. ............................ 706/47; 706/46; 707/503
(58) Field of Search ...................... 706/46, 47; 707/503

(56) References Cited

U.S. PATENT DOCUMENTS 5,701,400 A * 12/1997 Amado ........................ 706/45
6,278,793 B1 * 8/2001 Gur et al. .................... 382/128

OTHER PUBLICATIONS

Johansson Et Al, "Generalized Spreed–Sheets for CA CSD" Proceedings of the 1996 IEEE International Symposium on Computer–Aided Control System Design, Sep. 1996.*

* cited by examiner

*Primary Examiner*—George B. Davis
(74) *Attorney, Agent, or Firm*—William Scott Andes; Cantor Colburn LLP

(57) ABSTRACT

A rules data method is devised that records, documents, organizes, filters, and sorts a set of engineering rules along with other sets of rules. The rules database method may also correctly devise an order or sequence for a set of engineering rules. The rules database method comprises firstly, to create a database (14); secondly, to convert a set of symbolic equations to spreadsheet formula; thirdly, to write spreadsheet formula to a spreadsheet (18); and fourthly, to share a set of parameters of the database (14) with a computer aided design geometry (22).

28 Claims, 4 Drawing Sheets

Rule Form

| | |
|---|---|
| Rule ID | 1 |
| Name | Leading Edge Root Radius Blend |
| Module | Compressor |
| Recorded by | John Doe |
| Part | Blade |
| Original Date | 3/4/99 |
| Feature | Platform |
| Last updated | 3/4/99 |
| DP Ref | 7004 |
| Update History | |
| Discipline | Mechanical |

A "Status" equation (in spreadsheet format) must be supplied such that:
  Status < 0 ; Violated
  Status = 0 ; Active (This rule is driving the design)
  Status > 0 ; Satisfied Status Equation: =leoh-2/3*rf
Equation:

*Definition:*
$$leoh_{min} = \tfrac{2}{3} * r_f$$
*Rule:*
$$leoh \geq \tfrac{2}{3} * r_f$$

URL:

Record: |◀ ◀| 1 |▶ ▶|▶*| of 3

Parameter Form

| | |
|---|---|
| Parameter ID | 1 |
| Name | Root Fillet Radius |
| Type | Real |
| Symbol | rf |
| Description | Fillet radius between the airfoil and the platform |
| Units | inch |
| Max | 10.0 |
| Min | .001 |
| Formula | =max(rf_base*(Tm/Tm_base),rf_min) |

Record: |◀ ◀| 1 |▶ ▶|▶*| of 25

FIG. 3A

METHOD FOR DOCUMENTING ENGINEERING RULES

This application claims priority to the copending provisional patent application filed Sep. 12, 1999, Ser. No. 60/153,577.

FIELD OF THE INVENTION

The present invention relates generally to rule database methods, and, more specifically, to a method and apparatus for dynamically integrating a set of design intents into salient manifestations.

BACKGROUND OF THE INVENTION

In order to quickly and easily make design modifications; engineering rules defining a design intent needs to be associated with geometry represented in a CAD (Computer Aided Design) computer program. These engineering rules are often expressed using mathematical equations accompanied by pictures, sketches, tables and plots. The number of rules needed to describe simple designs may be rather large, and certainly the number of rules associated with complex designs such as an aircraft engine or automobile will be extremely large.

Typically, an existing Knowledge Based Engineering tool employs geometry that resides primarily in an embedded graphics package. This graphics package is generally inferior to commercial computer aided design (CAD) packages. For example, the graphics package may not have certain detailed features as that of the commercial computer aided design (CAD) packages or functionality to create complex curves. In addition, internal geometry may be simply exported without association to original rules and parameters to computer aided design (CAD) packages, whereby valuable information may be lost.

It is noted that existing CAD packages are inadequate in that when it comes to defining engineering rules that are not directly related to geometry, such as the minimization of stress or temperature, the existing methods cannot adequately address these issues.

BRIEF SUMMARY OF THE INVENTION

In an exemplary embodiment of the invention, the method comprises creating a database; converting a set of symbolic equations to spreadsheet formula; writing spreadsheet formula to a spreadsheet; and sharing a set of parameters of the database with a computer aided design geometry.

The present invention documents rules in a clear, detailed manner. Further, the rules may be organized, filtered and sorted, as well as associated with the appropriate CAD geometry so that the rules drive geometry changes to valid or optimal states. Furthermore, a simple approach to create, find, edit, sort, and correctly sequence the rules is provided. A mechanism is provided to associate those rules with CAD geometry. A combination of an easy to use database of rules and the association of those rules to CAD geometry, is an important feature of the invention. In the past, a number of CAD programs have attempted to provide a link from the CAD geometry to engineering rules, in other words, to approach the problem from the opposite direction. Typically these approaches fall short when it comes to adequately defining engineering rules which do not directly relate to geometry (such as the minimization of stress or temperature).

A number of attempts have been made to address the problem of linking engineering rules to CAD geometry. Other methods allow a user to associate engineering equations to geometry using a unique embedded programming language. These other methods use a translation package to convert the geometry from one format to that of other CAD products.

Thus, the present invention provides a method for recording, documenting, organizing, filtering, sorting and correctly sequencing engineering rules and associating those rules to their respective geometry in a CAD computer program. The method disclosed here allows logical design modifications to be driven by engineering rules having the resulting geometry generated in a CAD package. The method provides a tool that captures engineering rules and associates those rules to CAD geometry.

BRIEF DESCRIPTION OF THE DRAWINGS

FIG. 3A is a diagrammatic screen display of an application of the present invention.

DETAILED DESCRIPTION OF THE INVENTION

Figure 1:
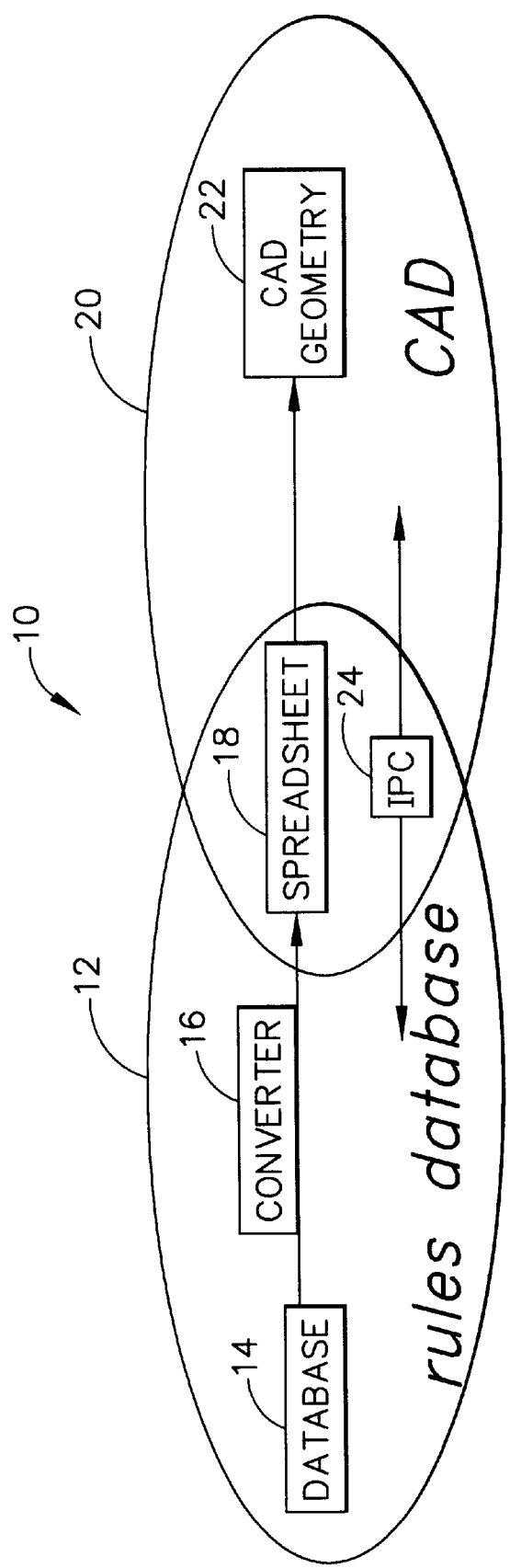
FIG. 1 is a schematic block diagram illustrating an application of the rules database method in the creation of a new design of the present invention.

Referring now to FIG. 1, a schematic diagram illustrating an application of the rules database method in the creation of a new design is generally shown at 10. A rules database 12 is defined which includes a database 14. The database 14 may contain data for the rules database method processing purposes. For example, Microsoft Access or Oracle may be used. Data in the database 14 is converted via a converter 16 (e.g., Visual Basic Code) to a spreadsheet 18 such as Microsoft Excel. It is within the scope of the present invention that any computer language having an inference engine may be employed in the place of spreadsheet 18. Furthermore, the converter 16 includes converter code such as computer software that converts database data into spreadsheet data. The spreadsheet 18 comprises a set of operators, for example, if rules define Length=2*Width, the definition may be simplified into L=2W, wherein 2* is defined as an operator. It is evident that the application 10 may comprise a display device (not shown) wherein data that are processed within the spreadsheet 18 can be displayed. The application 10 further comprises a computer aided design (CAD) section 20 wherein data processed through the spreadsheet 18 is transferred and utilized by a CAD geometry 22 and may be displayed via the display device. An inter-process communication (IPC) system 24 furnishes communication between the rules database 12 and the computer aided design (CAD) section 20. The inter-process Communication (IPC) system 24 acts as an Optional interfacing system between the rules database 12 and the computer aided design (CAD) section 20 being employed when no other communication device between rules database 12 and computer aided design (CAD) section 20 exist.

A set of design intents is manifested, in part, in a set of rules. There are several types of rules that we desire to capture within the definition of the designed system. They includes geometry rules, configuration rules, and engineering rules.

The Geometry Rules are rules which govern the relationship between two or more geometric constructs. For example, two lines may be specified as parallel or a line may be required to run tangent to an arc. In other words, a set of parameters may be defined such that a set relationship exists between the set of parameters.

The Configuration Rules are rules which govern the relationship between two or more geometric entities, and the selection of entities to be employed in the design. For example, a flange surface may be required to mate with an adjacent flange.

Figure 2:
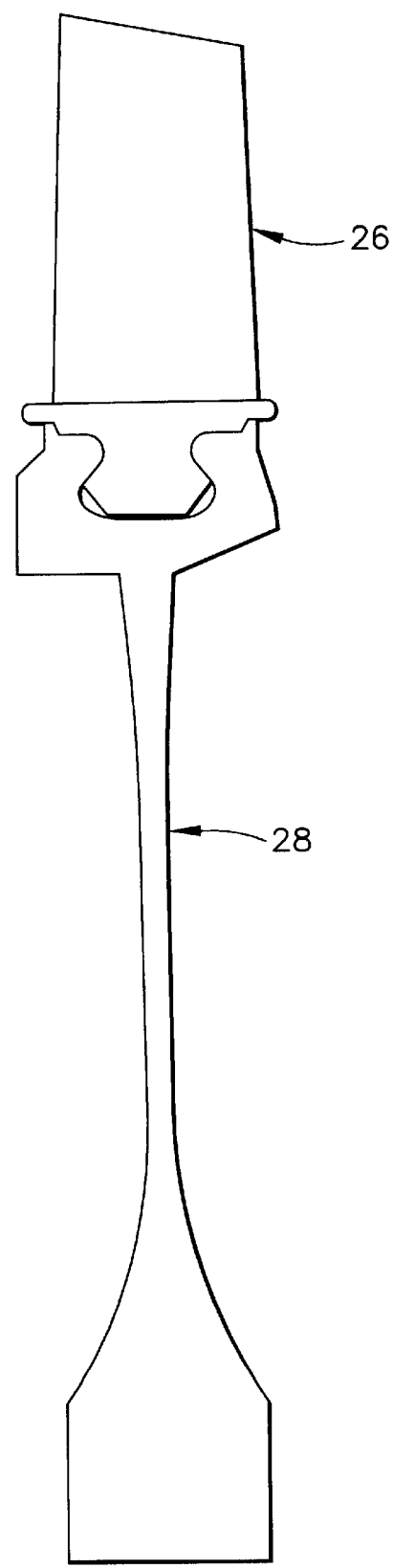
FIG. 2 is a side view of aircraft engine parts comprising an exemplary design.

The Engineering Rules are rules that govern design intent of the system driven by physics, aesthetics, experience or some other factor. Two categories of engineering rules are provided, i.e., Equality (Generative) Rules and Inequality (Checking/Objective) Rules. The Equality (Generative) Rules are rules used to set initial, default or standard conditions or geometry. (e.g., Length–2*Width) Yet another example for designing a blade 26 coupled to a disk 28 (exemplary components of n aircraft engine) as shown in FIG. 2 may include selecting initial configuration of parts, providing initial sizing of parts, allowing alternative generative rules for design purposes, and having higher fidelity generative rules that may require process integration to run analysis process. The Inequality (Checking/Objective) Rules are rules used to compare the current state of a design against some limiting constraint. Hence, checking the rules, e.g., Stress=60 ksi. Yet another example may include checking whether the blade 26 frequencies are above a minimum frequency, checking whether the disk 28 stress is below a maximum stress, and minimizing the disk 28 weight.

It is noted that engineering rules may be integrated or programmed within the spreadsheet 18. Furthermore, other rules may be integrated or programmed within the spreadsheet 18 as well.

There are several aspects of this rules database method that differ from prior approaches. First, regarding geometry rules, in most other approaches, the system geometry resides primarily in an embedded graphics package that is often inferior to commercial CAD packages. This rules database method links engineering rules directly to geometry in a commercial CAD packages. Therefore, the full advantage of the CAD packages, including their graphic capabilities, may be utilized. With respect to associating (note, not translating into CAD) with CAD, some other methods have the capability to translate internal geometry to CAD geometry. However, the instant rule database method directly associates engineering rules to CAD geometry rather than relying on internal geometric representations.

For language used to describe engineering rules, other methods typically have extensions of popular programming languages. For example, a number of CAD programs have made attempts to provide a link from the CAD geometry to engineering rules. In other words, the link is devised to approach the problem of interfacing between CAD and engineering rules from the opposite direction. However, typically these approaches are inadequate in that when it comes to adequately defining engineering rules which do not directly relate to geometry (such as the minimization of stress or temperature), the relationship tends to fall short of the mark. In other words, instead of association as in the present invention, other known method translate the communication between the spreadsheet 18, CAD geometry 22, and the database 14. It will be appreciated that the translation process necessarily involves getting deeper or to a lower level of operation than that of the association process of the present invention. Further, clearly readable mathematical equations, as are found in many mathematical books describing engineering rules, are used. This approach allows for ease of creation, understanding, documentation, and modification of the engineering rules.

The geometry rules are defined in the language supplied with most other methods. However, the present invention relies on the sketching functionality inherent in the CAD package rather than explicitly addressing these geometry rules. Thus, the ease of interfacing between CAD and other systems become evident.

The configuration rules such as the connectivity of parts in an assembly are defined in other methods using a supplied language. On the other hand, the present invention relies on the part association functionality inherent in the CAD package rather than explicitly addressing these configuration rules. The ease of interfacing is again apparent.

In a process for designing a system, the engineering rules that govern the intent of the design should be coupled with the geometry used to model the system. In this manner, the original engineering intent rather than a rebuilding of the affected system from scratch will drive subsequent changes to the design. The rules database method is one that provides the mechanism to easily create and manipulate rules in a symbolic equation format and associate them to applicable CAD geometry.

There are four basic components that make up the rules database method. First, the system re quires a such as Microsoft Access or Oracle, which stores basic elements of manipulation within the rules database method. Second, the rules database method requires a converter code, for example, software to convert database data to spreadsheet data. The converter code may be commonly available commercial converter code or proprietary devised converter code. Third, the rules database method requires a spreadsheet or a declarative CAD language, e.g., commercially available software packages such as Microsoft Excel. Fourth, a backup Inter-process communications (IPC) system may be needed. The SPC may be a link between the rules database spreadsheet and the CAD expressions.

An application of the rules database method in the creation of a new design includes:

Engineering rules documented in database using math editor and accompanying text;

Symbolic equations are translated, by the converter, to spreadsheet formulas or CAD declarative language;

The spreadsheet formulas in the database are written to a spreadsheet or to a CAD declarative language; and Parameters in the database are shared with those in CAD geometry (using IPC if necessary).

The declarative language must take up the role the spreadsheet plays in determining the correct sequence of computations.

An application of the rules database method in the modification of a design (without rules modification) includes:

Values in spreadsheets are modified; and

Parameters in the spreadsheet are shared with those in CAD geometry (using IPC if necessary).

An application of the rules database method in the modification of design rules (or addition of new innovations) includes;

Database of rules is searched and sorted to find relevant rules;

Engineering rules are modified using math equations and text;

Symbolic equations are translated to spreadsheet formulas or CAD declarative language;

The spreadsheet formulas in the database are written to a spreadsheet or to a CAD declarative language; and Parameters in the database are shared with those in CAD geometry (using IPC if necessary).

The declaration language takes up the role the spreadsheet plays in determining the correct sequence of computations.

Other functionality provided and/or defined by the rules database method includes:

A mechanism to toggle between competing equality (generative) rules—turning one off and another on—is supplied:

Inequality (checking/objective) rules may provide limits for the design or constraints for an optimization; and Inequality (checking/objective) rules may identify an entity that should be minimized, maximized or targeted to a specified value.

The status of an inequality (checking/objective) rule is provided as a guide to the design. The user may act upon a violated checking rule by selecting an alternative generative rule, adjusting the parameters of the design by hand or adjusting the parameters using some alternative approach such as design optimization or design of experiments. If none of these updates satisfy the design requirements, the user would likely choose to alter the design Concept.

As new innovations and alternate design concepts are developed, new sub-systems are identified and created with associated engineering rules. User selections or selections driven by rules at a higher level in the system dictate which child sub-systems exist in a given design. Parent systems and subsystems would control the number, type and configuration of child sub-systems.

The status of the checking rues comprises the fitness of the design to meet the desired design requirements. Iterations on the design parameters and possibly addition and modification of rules would take place until a satisfactory design was generated.

The present invention records, documents, organizes, filters, and sorts a set of engineering rules along with other sets of rules. Also, an order or sequence a set of engineering rules are provided. A database 14 is first created; secondly, a set of symbolic equations are converted to spreadsheet formula; thirdly, spreadsheet formula are written to a spreadsheet 18; and fourthly, a set of parameters of the database 14 are shared with a computer aided design geometry 22. In the case where a computer language having an inference engine is employed in the place of the spreadsheet (which is in itself a computer language having an inference engine) the formula will be in the syntax of that computer language.

It will be appreciated that the instant rules database method defines geometry as well as non-geometry parameters for interfacing between different programs or systems, such as the interfacing between the spreadsheet 18 and the database 14. Furthermore, the whole set of parameters may be subdivided into subset that contains common characteristics wherein the characteristics varies as situation demands. Those common characteristics cause the instant rules database method to devise ways such that the subset is taken as a whole for processing considerations. In other words, instead of addressing each element of the subset, the subset is addressed as whole because of tie existence of the common characteristics. Textual data is incorporated which may pop up for explanation purposes when certain conditions are met. For example, when the blade 26 in FIG. 2 are below a minimum frequency because of relationships with other parts, a textual explanation occurs. This may inform a user to react accordingly.

Figure 3B:
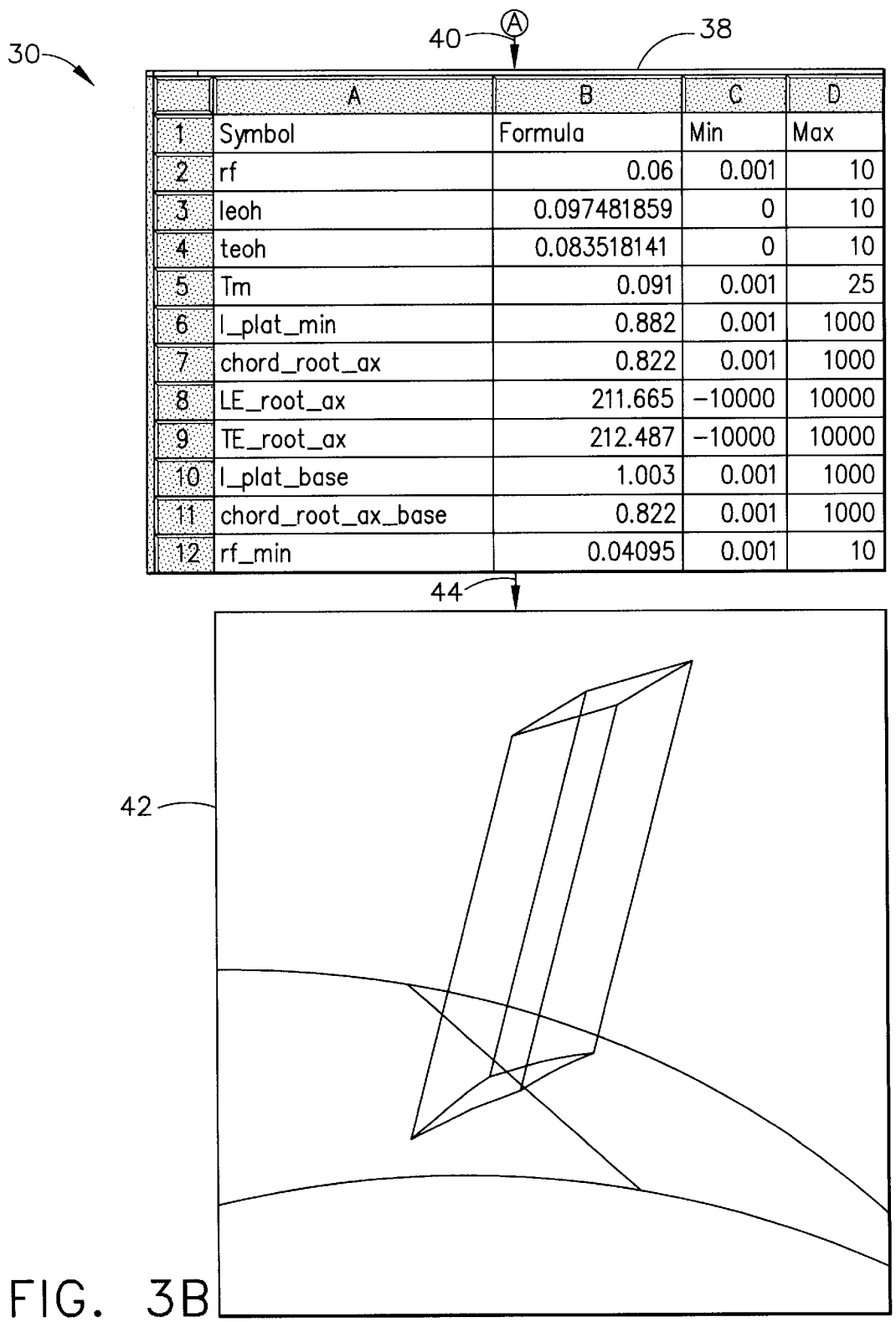
FIG. 3B is a diagrammatic screen display of an application of the present invention.

Referring now to FIGS. 3A and 3B, an exemplary layout of the database of the present invention is generally shown at 30. The rules are stored in a rules form 32 in a database such as Microsoft Access. A set of values are stored in various defined fields. A set of parameters, along with descriptive details and parameter limitations, are stored in a parameters form 34. The rules form 32 establishes relationships between parameters. The parameter form is used to clearly define each parameter. The resulting data are transferred to a spreadsheet 38 such as Microsoft Excel using a converter code 40. The spreadsheet 38 computes or otherwise processes the data. A subset of the data is transferred via IPC 44 if necessary to a computer aided design data structure (not shown) which in turn processes the data and displays a sketch 42.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What claimed is:

1. A method for processing rules, comprising:

creating a database;

converting a set of symbolic equations to a formula;

writing the formula to a program having a computer language utilizing an inference engine; and sharing a set of parameters of the database with a computer aided design geometry.

2. The method of claim 1, wherein creating the database comprises:

using a mathematical editor with accompanying text.

3. The method of claim 1, wherein converting a set of symbolic equations comprises:

converting the set of symbolic equations to a computer aided design declarative language.

4. The method of claim 1, wherein sharing the set of parameters of the database with the computer aided design geometry further comprises:

sharing by way of using an inter-process communication system.

5. The method of claim 1, wherein writing the formula comprises:

writing the formula to a computer aided design declarative language.

6. The method of claim 1 further comprising:

modifying a set of values; and sharing a set of parameters with a corresponding set of parameters within the computer aided design geometry.

7. The method of claim 6 wherein sharing the set of parameters with the corresponding set of parameters within the computer aided design geometry comprises;

using an inter-process communication system.

8. The method of claim 1 further comprising:

searching a new set of rules; and selecting rules among the new set of rules.

9. The method of claim 8 further comprising:

sorting the new set of rules.

10. The method of claim 1 further comprising:

toggling between a pair of competing equality rules whereby one rule of the pair of competing equality rules is turned off where another rule of the pair of competing equality rules is turned on.

11. The method of claim 1 further comprising:

determining a set value for optimization or design constraints.

12. The method of claim 1 further comprising:

identify a parameter; and optimize the parameter according to a set of rules.

13. The method of claim 1 further comprising:

selecting an alternative equality rule.

14. The method of claim 1 wherein the program having the computer language utilizing the inference engine comprises a spreadsheet program.

15. A storage medium encoded with machine-readable computer program code for processing rules along with other types of rules, the storage medium including instructions for causing a computer to implement a method comprising:

creating a database;

converting a set of symbolic equations to a formula;

writing the formula to a program having a computer language utilizing an inference engine; and sharing a set of parameters of the database with a computer aided design geometry.

16. The storage medium of claim 15, wherein creating the database comprises:

using a mathematical editor with accompanying text.

17. The storage medium of claim 15, wherein converting a set of symbolic equations comprises:

converting the set of symbolic equations to a computer aided design declarative language.

18. The storage medium of claim 15, wherein sharing the set of parameters of the database with the computer aided design geometry further comprises:

sharing by way of using an inter-process communication system.

19. The storage medium of claim 15, wherein writing spreadsheet formula comprises:

writing spreadsheet formula to a computer aided design declarative language.

20. The storage medium of claim 15 further comprising instructions for a computer to implement:

modifying a set of values; and sharing a set of parameters with a corresponding set of parameters within the computer aided design geometry.

21. The storage medium of claim 20, wherein sharing the set of parameters with the corresponding set of parameters within the computer aided design geometry comprises:

using an inter-process communication system.

22. The storage medium of claim 15 further comprising instructions for a computer to implement:

searching a new set of rules; and selecting rules among the new set of rules.

23. The storage medium of claim 22 further comprising instructions for a computer to implement:

sorting the new set of rules.

24. The storage medium of claim 15 further comprising instructions for a computer to implement:

toggling between a pair of competing equality rules whereby one rule of the pair of competing equality rules is turned off where another rule of the pair of competing equality rules is turned on.

25. The storage medium of claim 15 further comprising instructions for a computer to implement:

determining a set value for optimization or design constraints.

26. The storage medium of claim 15 further comprising instructions for a computer to implement:

identify a parameter; and optimize the parameter according to a set of rules.

27. The storage medium of claim 15 further comprising instructions for a computer to implement:

selecting an alternative equality rule.

28. The storage medium of claim 15 wherein the program having the computer language utilizing the inference engine comprises a spreadsheet program.

* * * * *